Figure 1:
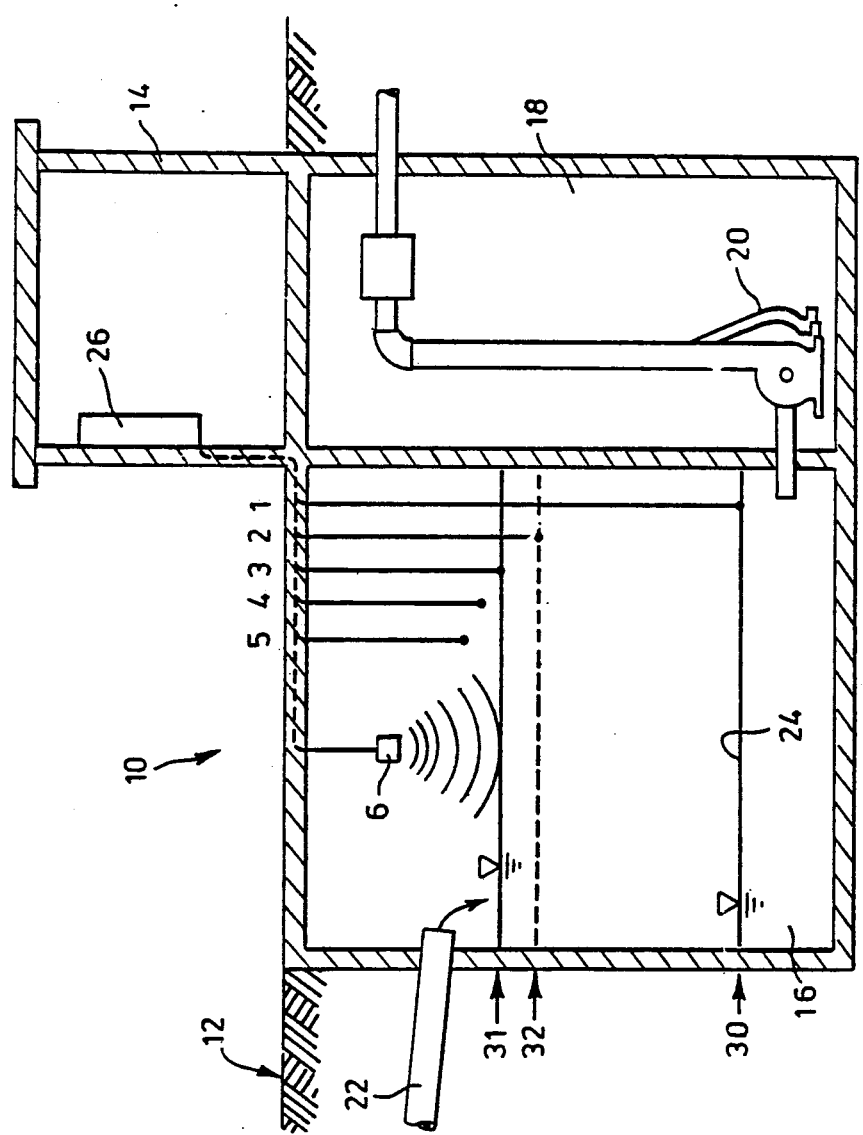

United States Patent [19]

Jorritsma

[11] 4,455,870

[45] Jun. 26, 1984

[54] METHOD AND APPARATUS FOR DETERMINING LIQUID FLOW RATES

[76] Inventor: Johannes N. Jorritsma, 37 Yonge St., Aurora, Ontario, Canada

[21] Appl. No.: 393,038

[22] Filed: Jun. 28, 1982

Related U.S. Application Data

[63] Continuation-in-part of Ser. No. 152,796, May 23, 1980, abandoned.

[51] Int. Cl.³ .............................................. G01F 3/38
[52] U.S. Cl. ........................................ 73/223; 73/861
[58] Field of Search .......................... 73/223, 224, 861; 222/63, 64; 364/510

[56] References Cited

U.S. PATENT DOCUMENTS 3,019,649  2/1962  Kuntz et al. ........................... 73/223
3,125,881  3/1964  Peters et al. .......................... 73/223
3,350,937  11/1967  Brewer ................................. 73/224
4,127,030  11/1978  Martig, Jr. ............................ 73/861

Primary Examiner—Herbert Goldstein
Attorney, Agent, or Firm—Sim & McBurney

[57] ABSTRACT

There is provided a method of determining the total inflow of a liquid through a liquid-flow system in which the liquid enters a sump cavity and is pumped out of the sump cavity by pump means. Computing means calculates an on-going total inflow volume for the liquid by (i) adding in the sump cavity volume between a lower and upper limit level each time the liquid surface rises to the upper limit level, and (ii) determining the inflow rate over the last portion of the filling time just described and extrapolating this inflow rate over the time when the pump means is pumping to yield an incremental quantity, such quantity being added in to the on-going total inflow volume.

13 Claims, 2 Drawing Figures

METHOD AND APPARATUS FOR DETERMINING LIQUID FLOW RATES

This is a continuation-in-part of U.S. patent application No. 152,796, filed on May 23, 1980, now abandoned, and having the same title.

This invention relates generally to a method and apparatus for determining an accurate measurement of the flow of liquid through a liquid system, for example a sewage system.

BACKGROUND OF THIS INVENTION

The prior art contains a number of patents directed to flow rate determining devices for liquid flowing in a liquid system. For example, U.S. Pat. No. 2,101,257, issued Dec. 7, 1937 to M. Vogel-Jorgensen, for "Apparatus for Measuring Liquid or Fluent Materials" discloses a measuring device for cement slurries fed to a rotary kiln. The concept is to provide a calibrated volume which may be placed into or out of the normal flow line for the cement slurry, such that a flow rate may be taken at intervals in order to monitor the rate at which the cement slurry is fed. This arrangement does not, of course, give an accurate totalized volume of flow over an entire flow period, but merely allows the instantaneous rate to be monitored from time to time. From these instantaneous rates, of course, an approximate idea may be had of the total volume passing through the flow line, but exact precision is not possible.

A similar problem arises with U.S. Pat. No. 2,392,951, R. G. Salisbury, issued Jan. 15, 1946 and entitled "Flow Meter". Here again, a calibrated volume is adapted to be placed into or out of connection with a line along which a fluid is continually flowing, in order to be able to monitor the rate of flow at specific intervals. However, a totalized and accurate flow volume over a continuous time period cannot be obtained by the use of the flow meter disclosed in this patent.

GENERAL DESCRIPTION OF THIS INVENTION

The invention herein disclosed is directed to the desirability of establishing as precisely as possible the total volume of a liquid flowing through a liquid system, by a process and apparatus which continuously measures liquid flow in a highly specific way. More particularly, this invention is applicable to sewage pumping stations, in which sewage is allowed to fill a sump cavity or wet well, and is intermittently pumped out of the sump cavity from an upper limit to a lower limit, by the use of one or more pumps. The latter procedure is a standard one for pumping stations in sewage lines.

In its broadest aspect, the method of this invention involves allowing the liquid to fill a sump cavity or wet well of the kind just described from a lower limit level to an upper limit level, to add to an electronic totalizer the total sump volume between the lower and upper limits, this addition being made at the time the sewage level reaches the upper limit, simultaneously establishing elctronically an inflow rate based on flow during at least a portion of the filling cycle from the lower to the upper limit, then pumping the sewage out of the sump cavity to allow the sewage level to drop from the upper to the lower level, and, while the pumping phase is in operation, continuously electronically adding to the totalized volume already established in previous cycles an incremental volume of fluid flow for each increment of time during which the pumping cycle is in operation.

In simpler language, the total volume flowing into the sump cavity over a complete cycle, i.e. over a filling and pumping cycle, is determined by taking first the total volume of the sump cavity between the lower and upper limit points (this being the total inflow during the filling cycle), and then by extrapolating over the pumping portion of the cycle a rate based on the filling cycle rate. In its broad aspect, the method would involve using any portion or the whole of the filling cycle volume to establish the instantaneous rate which would be the one extrapolated over the pumping part of the cycle. In a more specific and more accurate embodiment of this invention, the instantaneous inflow rate which is incrementally extrapolated over the pumping part of the cycle is based on the latter or a latter portion of the filling part of the cycle. For example, the averaged inflow rate over the last 10% or 20% of the filling cycle could be used, and this would generally give a more accurate instantaneous flow rate for extrapolation over the pumping portion of the cycle, particularly where the inflow rate into the sump cavity were changing gradually with time.

Accordingly, this invention provdes a method of determining the total inflow of a liquid through a liquid-flow system in which the liquid enters a sump cavity and is pumped out of the sump cavity by pump means, comprising the steps:
 (a) allowing the liquid surface to rise between a predetermined lower limit level and a predetermined upper limit level while the pump means is shut off,
 (b) detecting the arrival of the liquid surface at the upper limit level, and signalling the pump means to begin upon such arrival,
 (c) pumping the liquid out of the sump cavity at a rate faster than the inflow rate, whereby the liquid surface falls between said upper limit level and said lower limit level,
 (d) detecting the arrival of the liquid surface at the lower limit level, and turning off the pump at such lastmentioned arrival,
 (e) again allowing the liquid surface to rise as in step (a) and repeating steps (b), (c) and (d) in sequence;
 (f) calculating an on-going total inflow volume for the liquid by
  (1) adding in the sump cavity volume between the lower and upper limit levels each time the liquid surface rises to the upper limit level, and
  (2) determining the inflow rate over a part of the filling time described in (a) above, said part being during the second half of the filling phase, and extrapolating this inflow rate over the time when the pump means is pumping to yield an incremental quantity, such quantity being added in to the on-going total inflow volume.

Further this invention provides an apparatus for determining the inflow rate for liquid entering a sump cavity, comprising:
 first means for pumping the liquid out of said cavity at a rate faster than the inflow rate,
 second means for detecting the arrival of the liquid surface at a predetermined upper limit level and for generating a first signal which turns on said first means,
 third means for detecting the arrival of the liquid surface at a predetermined lower limit level and for generating a second signal which turns off said first means, fourth means for detecting the arrival of the liquid surface at a predetermined intermediate level between the lower and upper limit levels and for generating a third signal, and computing means adaped to calculate an ongoing total inflow volume for the liquid by (1) adding in the sump cavity volume between the lower and upper limit levels each time the liquid surface rises to the upper limit level, and (2) determining the inflow rate over the portion of the filling time during which the liquid surface rises from the intermediate to the upper limit level, and extrapolating this inflow rate over the time when the said first means is pumping to yield an incremental quantity, such quantity being added in to the on-going total inflow volume.

Figure 2:
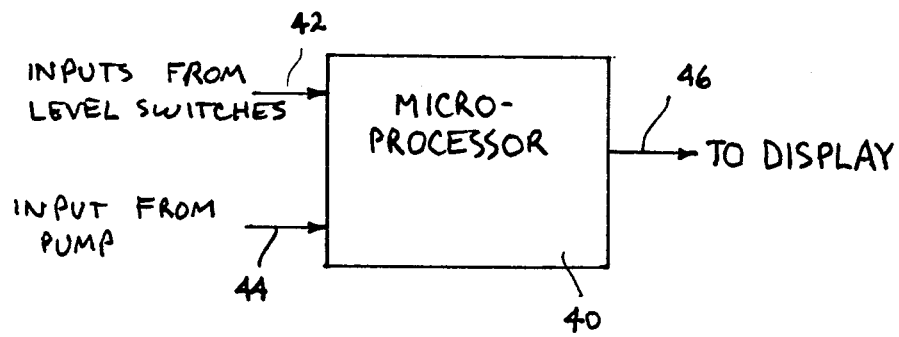

This invention is illustrated in the accompanying drawings, in which:

FIG. 1 is a somewhat schematic, vertical sectional view of a sewage pumping station; and FIG. 2 is a schematic view of a microprocessor for use in this invention.

In FIG. 1, a sewage pumping station generally shown by the numeral 10 has a major portion under the ground level 12, and an above-ground control structure 14.

The portion under the ground includes a wet wall 16, a dry well 18 in which a plurality of pumps 20 are located, and an inlfow sewage pipe 22. The sewage, in the embodiment illustrated, flows by natural gravity flow into the wet well 16 through the pipe 22.

Located in the wet well 16 are five level detectors numbered 1-5, with the numbers appearing directly above the vertical suspension lines which support the detectors. Detector 1 establishes a lower limit level for the liquid surface 24 in the sump cavity 16, and detector 3 establishes an upper limit level for the liquid surface. Intermediate detector 2 is located at a point within the last 20% of the distance between the lower level and the upper as determined by the detectors 1 and 3, and its purpose will become apparent subsequently.

Detector 4 is a further detector which is capable of bringing extra pumping capacity into operation, in case the initial pumping capacity is insufficient to start to drop the level of the liquid in the sump cavity 16. Detector 5 is a high alarm detector, which sets off some alarm device if the liquid level rises to that point. The numeral 26 denotes a control panel which houses various conventional pump control relays and which is adapted to receive the information coming by way of the detectors 1-5.

The provision of the physical detectors 1-5 constitutes the first embodiment of this invention. In the second embodiment, all of these detectors 1-5 may be replaced by an ultrasonic detector 6 of conventional variety, the ultrasonic detector 6 having the capability of determining and signalling the arrival of the liquid surface 24 at various predetermined vertical positions.

The method herein disclosed is essentially for determining the inflow rate for sewage entering the sump cavity 16 through the sewage pipe 22, the liquid being intermittently pumped by one or more of the pumps 20 out of the sump cavity 16. The method includes the following steps:

It is first assumed that the liquid surface 24 is located at the lower limit level where shown in FIG. 1, i.e. that to which the detector 1 reaches. Sewage flows into the sump cavity 16 through the sewage pipe 22, thus causing the liquid surface 24 to rise from the lower limit level hereinafter identified by the arrow 30, toward the upper limit level identified by the arrow 31. During this rise of the liquid surface 24 between the positions 30 and 31, the pump means 20 are not in operation.

The arrival of the liquid surface 24 at the upper limit level 31 is detected either by the detector 3 or by the ultrasonic detector 6, and a signal is generated which turns on one or more of the pumps 20, in accordance with criteria subsequently to be explained.

The number of pumps to be turned on is automatically selected to be sufficient to pump the liquid out of the sump cavity 16 at a faster rate than the inflow through the sewage pipe 22, thereby causing the liquid surface to drop downwardly from the level 31. The arrival of the liquid surface at the lower limit level identified by arrow 30 is then detected, either by the detector 1 or by the ultrasonic detector 6, at which point the pump or pumps 20 are turned off. The liquid is again permitted to rise up toward the upper limit 31, and the cycle repeats.

In essence, the computing device incorporated in the control panel 26 is able to calculate an on-going total inflow volume for the liquid by (1) adding in the sump cavity volume between the lower and upper limit levels each time the liquid surface rises to the upper limit level, and (2) determining the inflow rate over at least a portion of the filling time between the lower and upper limit levels, and extrapolating this inflow rate over the time when the pump means is pumping to yield an incremental quantity, such quantity being added in to the on-going total inflow volume.

More specifically, the computing device, typically an electronic calculating device, will determine the inflow rate described under (2) above on an incremental basis, so that, while the pumps are pumping, an increment of volume can be added in to the on-going total for successive time increments. These time increments would typically be no longer than 1 second duration.

While, in its broad aspect, this invention contemplates using the entire length of time to fill the sump cavity from the lower limit level to the upper limit level as the basis for calculating the inflow rate which is used to extrapolate over the pumping phase, the preferred embodiment of this invention utilizes only a portion, a preferably a latter portion, of this filling phase to establish an inflow rate which can be extrapolated on an incremental basis. It is for this purpose that the intermediate level shown by arrow 32 is also established, the level 32 lying between the level 30 and 31. Again in the preferred embodiment, the intermediate level 32 lies closer to the level 31 than to the level 30. Even more specifically, the intermediate level 32 may be located such that the volume of the sump cavity 16 lying between levels 31 and 32 amounts to not more than about 20% of the volume of the sump cavity lying between the levels 30 and 31.

In FIG. 2, a microprocessor 40 receives input from the level switches along line 42, and the input from the pump along line 44. The microprocessor provides information along line 46 to a display.

It will be understood from the preceding disclosure that the microprocessor would be equipped with means by which it can be programmed with the total sump volume between the lower limit level and the upper limit level, and the fractional sump volume between the intermediate level and the upper limit level.

While one embodiment of this invention has been illustrated in the accompanying drawings and described hereinabove, it will be evident to those skilled in the art that changes and modifications may be made therein without departing from the essence of this invention, as set forth in the appended claims.

During the time that the liquid surface 24 is rising upwardly from the lower limit level 30, its arrival at the intermediate level 32 is detected, and a measurement is taken of the length of time required for the liquid surface to rise from the intermediate level 32 to the upper limit level 31. This particular time, taken together with the actual volume of the sump cavity 16 between the levels 31 and 32, is used to determine an average inflow rate over the latter portion of the filling time, and then this latter inflow rate is incrementally added to the on-going total over the pumping portion of the cycle, thus yielding a more accurate estimated inflow for the pumping portion, and a more accurate overall inflow.

Although there is no criticality in connection with the particular percentage of the total "fill" volume represented by the sump cavity volume lying between levels 31 and 32, it is considered that this percentage is best kept relatively small, preferably below 20% and even more preferably lying between 5% and 12% of the volume of the cavity between levels 30 and 31.

With respect to the pumps 20, it is preferred to provide, for a typical installation, one larger pump and one smaller pump, working in parallel, but capable of being operated either separately or together. The selection of the particular pump to use at any given time would be made automatically, and would be based on the measured filling rate over the most recent filling portion of the cycle. Thus, where the filling rate is smaller than a given preestablished value, the smaller of the two pumps would be utilized. Where the filling rate exceeds the predetermined value, the larger of the two pumps would be employed. A further predetermined value, higher than the one just discussed, could also be established in such a way that if the sewage inflow exceeds this latter, higher value, both pumps could be operated simultaneously to achieve maximum output.

If desired, a further pump or pumps may be provided, as back-up pumps, or as pumps which can be called into operation in case of a particularly high inflow rate. For example, the back-up or additional pumps could be put into operation upon the liquid surface rising to the detection point for the detector 4 in FIG. 1.

While a particular embodiment of this invention has been illustrated in the attached drawing and described hereinabove, it will be apparent to those skilled in the art that modifications and changes may be made therein, without departing from the essence of this invention as set forth in the appended claims.

I claim:
1. A method of determining the total inflow of a liquid through a liquid-flow system in which the liquid enters a sump cavity and is pumped out of the sump cavity by pump means, comprising the steps:
   (a) allowing the liquid surface to rise between a predetermined lower limit level and a predetermined upper limit level while the pump means is shut off,
   (b) detecting the arrival of the liquid surface at the upper limit level, and signalling the pump means to begin upon such arrival,
   (c) pumping the liquid out of the sump cavity at a rate faster than the inflow rate, whereby the liquid surface falls between said upper limit level and said lower limit level,
   (d) detecting the arrival of the liquid surface at the lower limit level, and turning off the pump at such lastmentioned arrival,
   (e) again allowing the liquid surface to rise as in step (a) and repeating steps (b), (c) and (d) in sequence;
   (f) calculating an on-going total inflow volume for the liquid by
      (1) adding in the sump cavity volume between the lower and upper limit levels each time the liquid surface rises to the upper limit level, and
      (2) determining the inflow rate over a part of the filling time described in (a) above, said part being during the second half of the filling phase, and extrapolating this inflow rate over the time when the pump means is pumping, such extrapolated value being added in to the on-going total inflow volume.

2. The method claimed in claim 1, in which the step (f) is carried out electronically.

3. The method claimed in claim 1, in which the step of determining the inflow rate described in step (f2) is done on an incremental basis, so that, while the pumping means is pumping, an increment of volume can be added in to the ongoing total for successive time increments.

4. The method claimed in claim 1, in which said part is the last part of the filling phase, and is less than 20% of the filling phase.

5. The method claimed in claim 4, in which said last part is between 5% and 12% of the filling phase.

6. The method claimed in claim 1, in which the steps involving detecting the arrival of the liquid surface at various levels are carried out by ultra-sonic detection means.

7. The method claimed in claim 1, in which the step under (f2) is accomplished by using the arrival of the liquid surface at an intermediate level between the lower and upper limit levels.

8. Apparatus for determining the inflow rate for liquid entering a sump cavity, comprising:
   first means for pumping the liquid out of said cavity at a rate faster than the inflow rate,
   second means for detecting the arrival of the liquid surface at a predetermined upper limit level and for generating a first signal which turns on said first means,
   third means for detecting the arrival of the liquid surface at a predetermined lower limit level and for generating a second signal which turns off said first means,
   fourth means for detecting the arrival of the liquid surface at a predetermined intermediate level between the lower and upper limit levels and for generating a third signal,
   and computing means adapted to calculate an ongoing total inflow volume for the liquid by
      (1) adding in the sump cavity volume between the lower and upper limit levels each time the liquid surface rises to the upper limit level, and
      (2) determining the inflow rate over the portion of the filling time during which the liquid surface rises from the intermediate to the upper limit level, and extrapolating this inflow rate over the time when the said first means is pumping, such extrapolated value being added in to the on-going total inflow volume.

9. Apparatus as claimed in claim 8, in which said computing means calculates the inflow rate on an incremental basis, so that while the first means is pumping, an increment of volume can be added in to the on-going total for successive time increments.

10. The apparatus claimed in claim 8, in which the volume of the sump cavity between the intermediate and upper limit levels is less than 20% of the volume of the cavity between the lower and upper limit levels.

11. The apparatus claimed in claim 8, in which the volume of the cavity between the intermediate and upper limit levels is between 5% and 12% of the volume of the cavity between the lower and the upper limit levels.

12. The apparatus claimed in claim 8, in which each of the second, third and fourth means includes ultrasonic detection means.

13. The apparatus claimed in claim 8, in which said first means includes at least one larger and one smaller pump, the apparatus further including control means which selects (a) the smaller pump, (b) the larger pump or (c) both pumps together, to pump liquid out of said cavity depending upon the inflow rate being determined by the computing means.

* * * * *